Patented Nov. 24, 1931

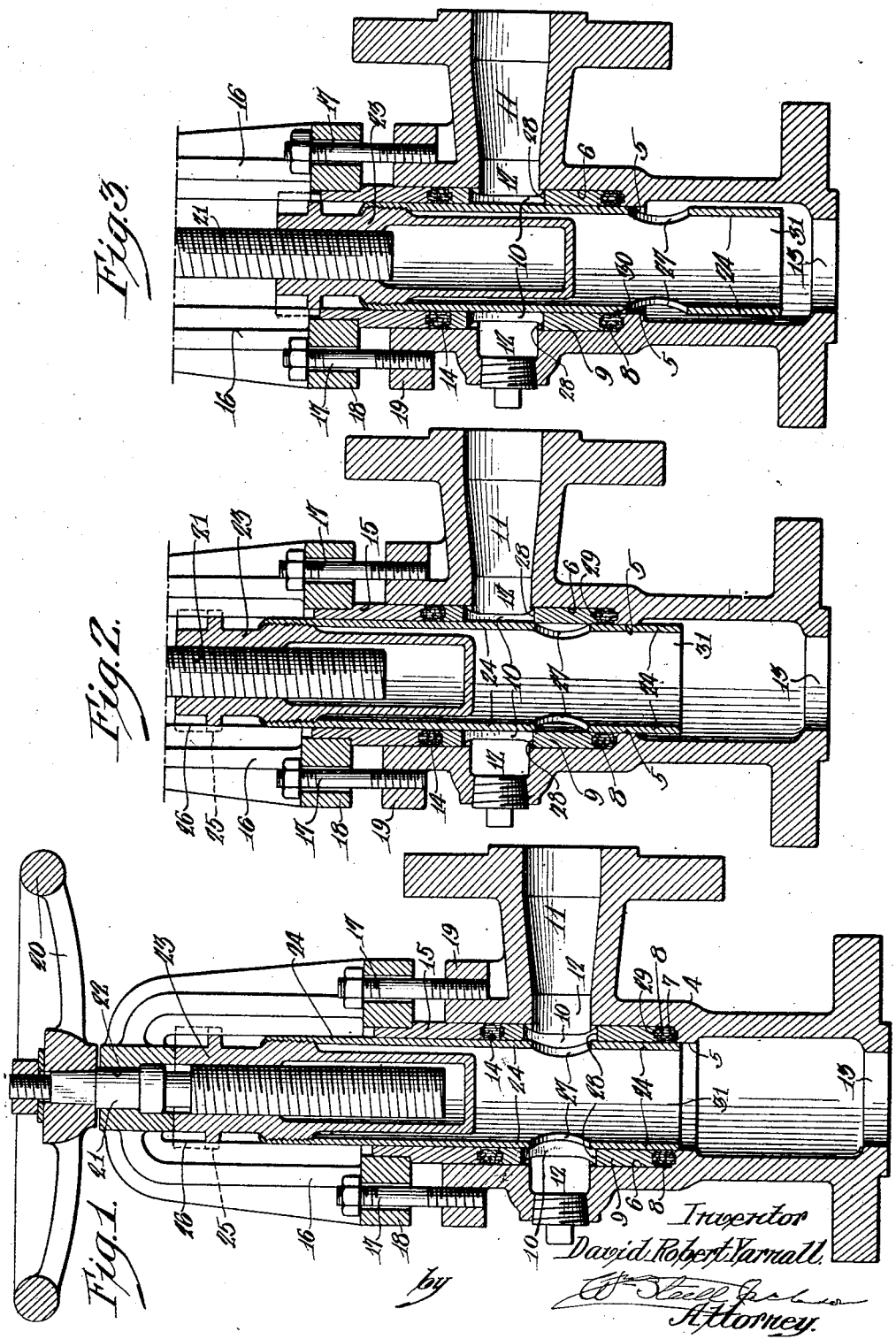

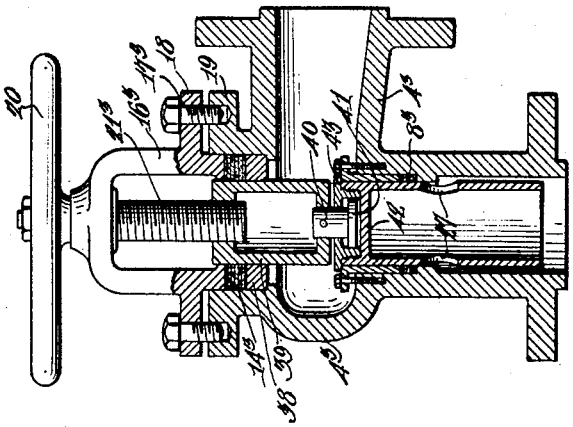
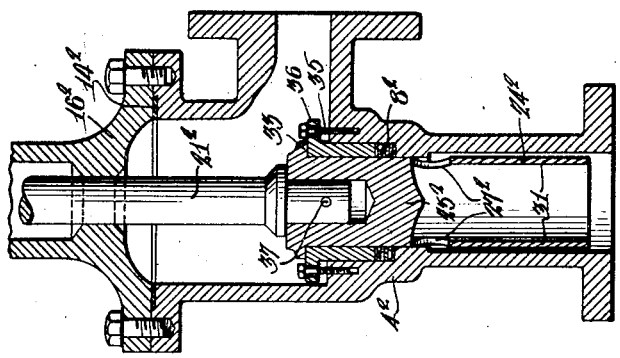
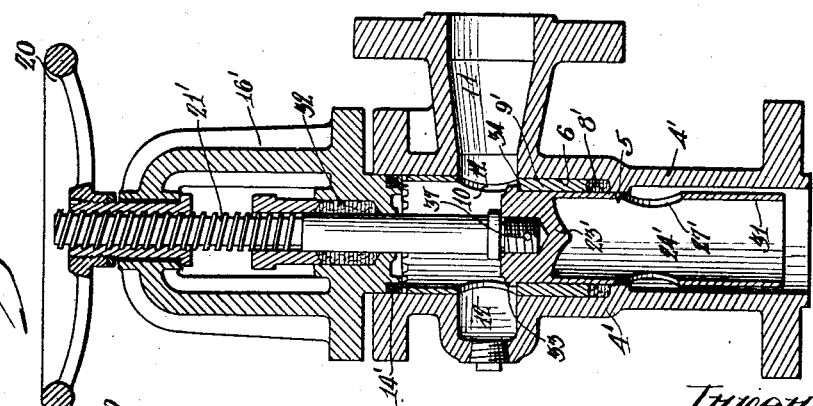

1,833,629

UNITED STATES PATENT OFFICE

DAVID ROBERT YARNALL, OF PHILADELPHIA, PENNSYLVANIA, ASSIGNOR TO YARNALL-WARING COMPANY, OF PHILADELPHIA, PENNSYLVANIA, A CORPORATION OF PENNSYLVANIA

SEATLESS BLOW-OFF VALVE

Application filed January 4, 1927, Serial No. 158,860, and in Great Britain April 30, 1927. Serial No. 11,570.

My invention relates to seatless blow-off valves having annular packing exposed by movement of a plunger past the packing.

The main purpose of my invention is to protect the lower packing from erosion from impact of fluid passing through the valve.

A further purpose is to place the lower packing at a distance beyond the inlet opening greater than the length of the inlet opening so that the rush of fluid may be effectively stopped before the opening in the plunger passes the packing.

Further purposes will appear in the specification and in the claims.

I have preferred to illustrate my invention by application to several types of one form of valve only, though I recognize that it may be applied to any seatless valve having annular packing otherwise exposed to this erosion. I have selected a form which is practical and highly successful and which well illustrates the principles involved.

Figure 1 is a longitudinal section of a blow-off valve embodying the invention with the parts in open position.

Figure 2 is a fragmentary section corresponding to Figure 1 with the parts in intermediate position.

Figure 3 is a fragmentary section corresponding to Figure 1, showing the parts in closed position.

Figures 4, 5 and 6 are longitudinal sections illustrative of other valves of the same general form to which my invention may be applied. Each is shown in closed position.

Figure 7 is a side elevation on reduced scale and partly broken away showing another valve to which my invention is applied.

In the drawings similar numerals indicate like parts.

The valve body 4 is shown in Figures 1–3 as bored at 5 and as counterbored at 6, forming a seat 7 for lower packing 8, held in place by a shell 9 here effectively forming a liner. This liner is the effective valve interior and is apertured at 10 at the level of the inlet 11 to pass the blow-off discharge, a channel 12 surrounding the liner so as to increase the cross section of inlet flow. The outlet is shown at 13.

Upper packing 14 is pressed downwardly by follower 15, held in place by yoke 16, secured by suitable bolts 17 through flanges 18 and 19. Wheel 20 is united rigidly to stem 21 which has bearing in the yoke at 22, and is prevented from longitudinal movement in it in any suitable manner.

The stem is threaded into plunger 23 so as to lift and lower the operative part of the plunger, here a rigidly attached sleeve 24. The plunger is held against rotation by projections 25 traveling in guides 26 within the yoke. The sleeve is provided with openings 27 which are thus effectively openings in the plungers.

Both packings, 8 and 14 are swelled by pressure in a direction axial to the plunger so as to engage with the plunger (sleeve) and seal against it during its travel.

In the best prior practice known to me and represented by such patents as Yarnall, Nos. 1,103,120 and 1,525,113, the distance between the inlet openings 10 of the valve body (here the lining) and the lower packing has been considerably less than the length, parallel to the plunger axis, of the openings 27 in the plunger sleeve, so that, with closing movement of the plunger, the lower packing has been exposed by passage of the lower parts of openings 27 across it before the upper parts of openings 27 have passed the lower edges of the inlet openings 27. As a result, in these prior forms the mixed steam, water and dirt of the blow-off, passing through the openings 10 and 27, still in partial registry, has but the exposed lower packing during the interval between the earliest exposure of this packing and the complete travel of openings 27 past openings 10.

As a result of this exposure of the lower packing it has been seriously and unnecessarily eroded. I have discovered that this erosion may for all practical purposes be eliminated by making the distance between the lower edge 28 of openings 10 and the upper edge 29 of packing 8 greater than the length parallel to the axis of the openings 27 so that, as best seen in Figure 2, the openings 27 wholly pass the openings 10 before the openings 27 begin to uncover the lower packing. My invention is applicable whether the openings 10 in the lining are larger than the openings 27 in the plug, as in Figures 1–3 or match them as in Figure 4 or terminate the lining at a level which for effective purposes represents the "bottom of openings 10" as in Figures 5 and 6.

This extra length between the inlet from the body and the packing necessitates, of course, a considerably longer valve travel, since for complete closure the plunger must travel to the position shown in Figure 3 where the portion 30 of the plunger shell opening 27 seals with the packing. It requires also a longer skirt 31 upon the sleeve or shell so that this skirt will protect the packing in open position (Figure 1).

Figure 4 the valve body 4' is bored at 5 and counterbored at 6, and is provided with a liner 9' which engages packing 8' at the bottom and packing 14' at the top. The yoke 16', wheel 20 and stem 21' perform the same function as in the form of Figures 1, 2 and 3, but the stem 21' is bodily movable and lifts and lowers a plunger 23' carrying sleeve 24'. Both packings are tightened by tightening the yoke upon the body of the valve and the stem is here sealed by an ordinary gland 32.

The lower packing is tightened by engagement of the projection 33 upon the plunger, here an annular shoulder, with portion 34 of the lining, also here a shoulder.

The plunger performs no sealing function above the inlet openings. It is provided with openings 27' and with skirt 31. The liner 9' is of such length below the inlet opening that, with closing movement of the valve, the upper edges 30 of the opening 27 pass below the lower edges 28 of the inlets through the liner before the lower edges of the opening 27' begin to pass the packing 8'.

This requires, again, that the skirt 31 shall be long enough below the lower edge of the opening or openings 27' so that the lower edge of the skirt shall remain in engagement with the packing 8', while the opening 27' is registered with the openings 10.

In Figure 5 the upper part of the body $4^2$ is closed by a cap $16^2$ and the operating mechanism for the longitudinally movable stem $21^2$ and plunger $23^2$ is not shown. The body and cap are sealed by packing $14^2$ and the shell by which the packing $8^2$ is held and tightened as in the nature of a gland. The packing $8^2$ is tightened about the plunger $23^2$ by screws 35 through flanges 36 and is further tightened when the valve is closed by engagement of projections 33 upon the plunger with the gasket shells for convenience viewed as a lining.

As in Figure 4, the stem is fastened into the plunger by means of a pin 37.

Here the axial length of the lining gland is greater than the length, axially, of the openings $27^2$ in the lower part of the plunger, and the skirt 31 of the plunger is long enough to maintain contact with the packing $8^2$ in the highest position of the plunger.

In Figure 6 the body $4^3$ and yoke $16^3$ are united by flanges 18 and 19, and bolts $17^3$ and packing $14^3$ is used between the yoke and the annulus 38. The packing is thus squeezed against a cylinder 39 which forms part of the operating mechanism for the plunger. It is lifted and lowered by a threaded stem $21^3$ held against longitudinal movement within the yoke and turned by wheel 20.

At the lower end the yoke is fastened to a pin 40 whose head 41 lies within a recess formed between the plunger member 42 and a collar 43 threaded into it. The lining or shell is here also a gland held in position and holding the packing as in Figure 5. The packing may here also be tightened by axial engagement between the plunger top and the gland.

The upper part of the plunger above the opening 27 is here also long enough to extend in closed position down below the packing as in the other figures, and the lining gland has sufficient axial length so that in closing movement the upper end of the opening 27 is below the top of the lining before the lower end of the opening begins to pass the packing $8^3$. The projection 33 again engages the top of the lining, shell or gasket.

In all of Figures 4, 5 and 6 the packing is protected against erosion by the blow-off, as in Figures 1–3.

Figure 7 shows the invention applied to a valve having a single port only between the inlet and the plug closure.

Since erosion of exposed packing by the blast of steam, water and dirt greatly reduces the effective life of the packing and my invention fully protects the packing from this, I tremendously increase the life of the packing in all valves where there would otherwise be exposure of the packing.

Though I have described the valve shown at some length in order that such illustration as I make may be clear, I wish it understood that for my present purpose the illustration is intended to be diagrammatic rather than specific, and that I have no thought of confining the application of the invention to this particular valve.

Having thus described my invention, what I claim as new and desire to secure by Letters Patent is:—

1. In a blow-off valve, a valve body having lateral opening and a bore perpendicular to the opening, annular packing within the bore, a lining engaging the packing and permitting inlet to the interior of the lining from the valve inlet, a plunger having a projection engaging the lining to compress the lining upon the packing and having openings in the plunger to its hollow interior shorter in axial length than the extent of lining between the packing and the point at which fluid inlet to the lining is permitted.

2. A blow-off valve body having an inlet and an outlet, a bonnet thereon, a seat for packing within the outlet, a valve lining coaxial with the outlet permitting inlet to its interior from the valve inlet, extending above the valve inlet and engaging the packing axially, bonnet holding means for pressing the lining axially to compress the packing, and a hollow plunger movable axially within the packing, apertured to admit fluid to the interior from the valve inlet in open position of the valve and having a skirt long enough to cover the packing in this position, the aperture in the plunger being shorter in axial length than the distance between the packing and the nearer edge of the lining at which inlet fluid is admitted to the interior of the lining.

3. A blow-off valve body having an inlet and an outlet, a seat for packing within the outlet, a valve lining coaxial with the outlet permitting inlet to its interior from the valve inlet, extending above the valve inlet and engaging the packing axially, means for pressing the lining axially to compress the packing, a hollow plunger movable axially within the packing, apertured to admit fluid to the interior from the valve inlet in open position of the valve and having a skirt long enough to cover the packing in this position, the aperture in the plunger being shorter in axial length than the distance between the packing and the nearer edge of the lining at which inlet fluid is admitted to the interior of the lining and a projection from the plunger engaging an intermediate point in the lining to further compress the lining.

DAVID ROBERT YARNALL.